United States Patent Office 2,923,629
Patented Feb. 2, 1960

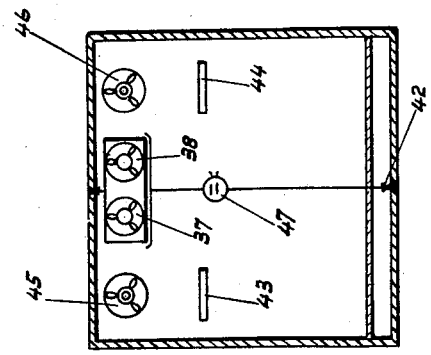
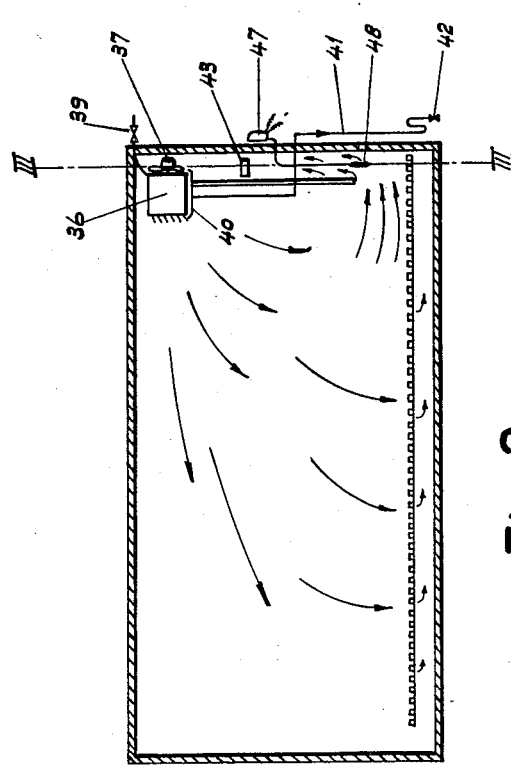

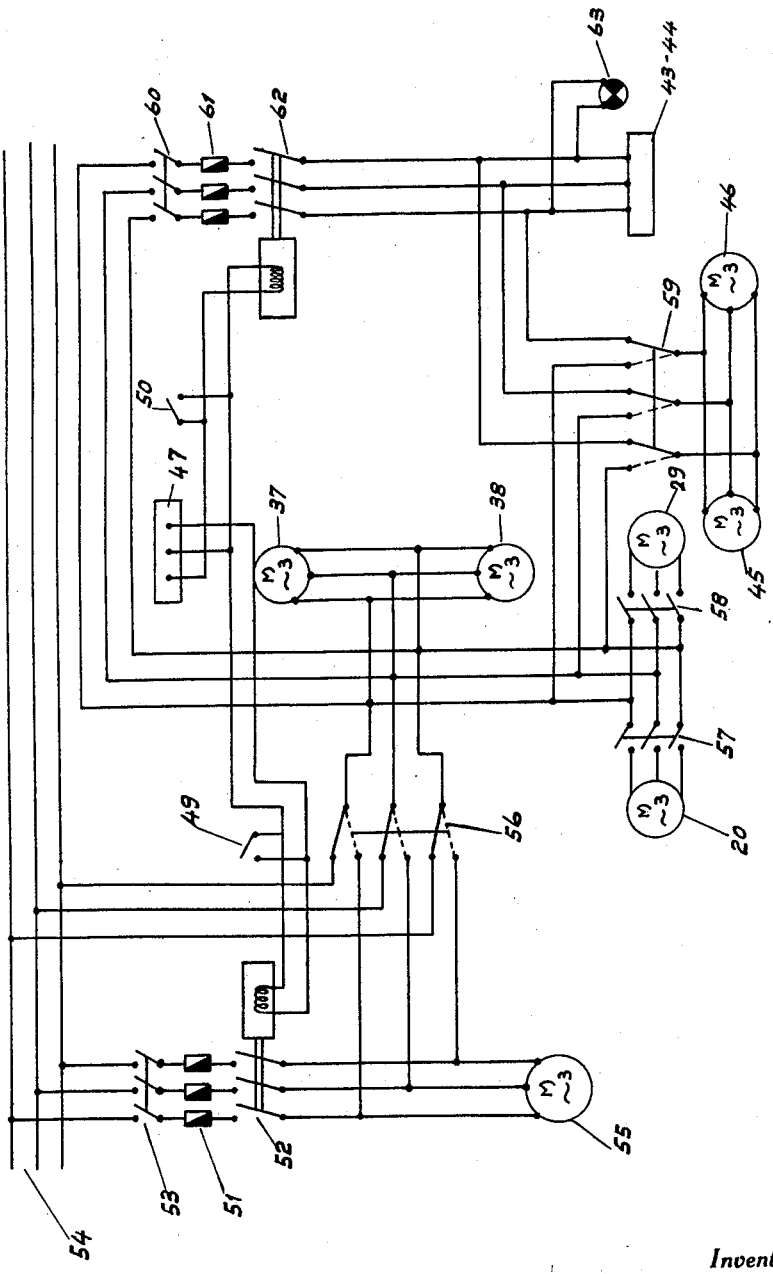

2,923,629
PROCESS FOR TREATING VEGETABLE PRODUCTS

Felice Bonomi, Milan, Italy, assignor of one-half to Ernesto Buehler, Milan, Italy Application January 3, 1956, Serial No. 557,202

Claims priority, application Italy January 8, 1955

2 Claims. (Cl. 99—103)

The present invention relates to a process for treating vegetable products in general and, particularly, for treating orchard and garden products, in order to influence the vital activity thereof, that is, to insure preservation for a certain length of time or to delay or to accelerate ripening.

The present process is based on careful theoretical and experimental research work, in the course of which it has been found that the respiratory activity of vegetables which are detached from the plant, and, therefore, their vital condition, although mainly dependent on the oxygen concentration and the surrounding atmosphere, may vary considerably also in relation with the pressure of said atmosphere. In other words, it has been found, for example, that artificial atmospheres with low oxygen concentration or, comparatively speaking, in depression state, delay the ripening of vegetables subjected thereto, while gaseous mixtures with high oxygen concentration or, in a more or less elevated pressure, accelerate the ripening of such vegetables.

The process of the present invention is characterized in that in a gas-tight room containing the products to be treated there is provided an artifical atmosphere with the oxygen concentration most appropriate for the character and condition of such products and the absolute pressure of such atmosphere is adjusted in relation with the desired rapidity of ripening of such products.

According to a further feature of the present invention the oxygen concentration in such room or chamber is then automatically maintained constant with the carbon dioxide being completely eliminated therefrom as it forms. The humidity ratio is adjusted so as to keep it at an absolute level (about 85–90%) and the heat developed is absorbed so as to insure in such room a constant temperature. All of these conditions are indispensable in order to preserve the integrity of the products treated.

It is well known that, during any treatment for preserving or ripening vegetables in general and fruit in particular, aqueous vapor and heat accumulate in the room containing the products, as a consequence of the respiration of the products, as well as gaseous products of metabolism being present, due to the biochemical reactions that take place in the living cells. By experiment, it has been found that also in the case of preservation in condition of microaerobiosis, it is necessary to eliminate the gaseous products of metabolism as they form, among these products being carbon dioxide. The accumulation of carbon dioxide in the room, wherein the vegetables are stored, always causes an unbalance in the biological functions thereof if not a change of biochemical reactions, thereby causing secondary phenomena which, in some cases, are such as to determine proper autocatalysis reactions with the participation of carbohydrates contained in the vegetable tissues.

Another phenomenon, which may cause decay or at least depreciation of the treated products, is the gradual reduction of the oxygen content in the atmosphere in the room or chamber containing the products because of the respiration of the products. In cases of excessive lowering of the percentage content of oxygen in the atmosphere surrounding the products, there occur phenomena of intra molecular alcoholic fermentation which, as a result, causes the carbohydrates and particularly sugars (saccharoid compounds) to decompose with consequent spoiling of the vegetables in question or, at least, with a definite alteration of the taste and odor characteristics.

The life of vegetable products further involves, with regard to the respiration, the phenomenon of transpiration which entails a continuous accumulation of aqueous vapor in the room or chamber wherein they are contained with the products becoming rapidly saturated so as to lead to the development of mold in the products, of softening thereof or other analogous deterioration thereof.

It is also an object of the present invention to provide an equipment for carrying out the process described hereinbefore, such equipment meeting automatically all requirements for the maintaining of an artificial atmosphere suited to preserve the integrity of the products treated.

In the accompanying drawings:

Figure 2 is a longitudinal sectional view of the chamber showing the unit or means for adjusting the ratio of moisture and temperature;

Figure 3 is a cross-sectional view taken substantially on line 3—3 of Figure 2;

Figure 4 is a schematic view of the wiring arrangements and connections by means of which the ratio of moisture and the heating or cooling of the chamber are automatically adjusted.

Figure 1:
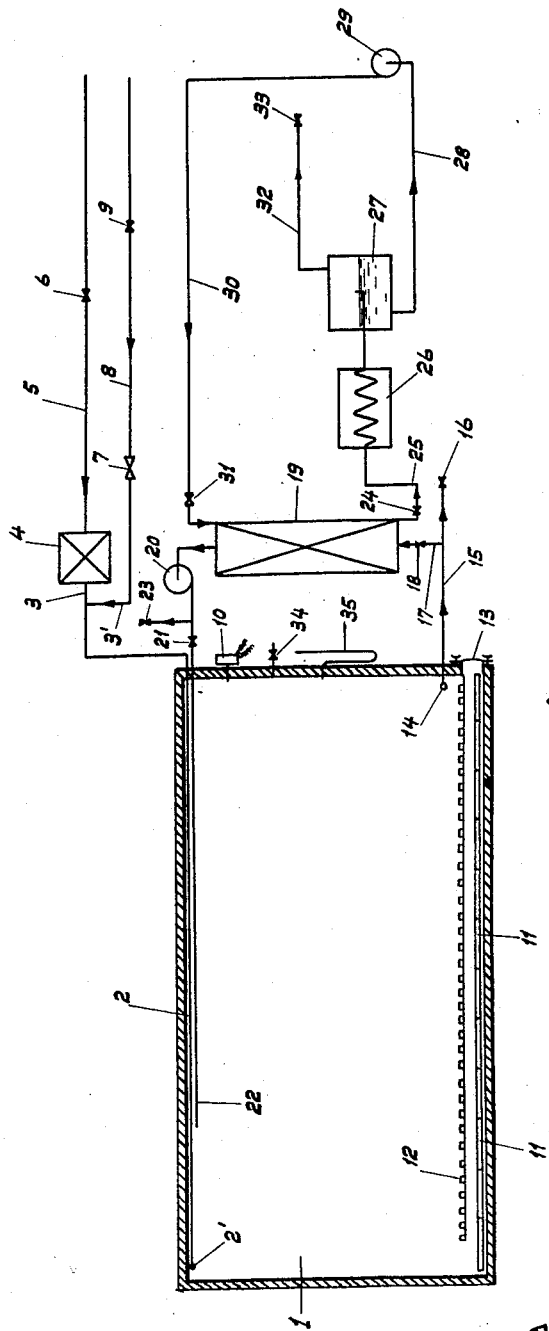
Figure 1 is a longitudinal sectional view of a chamber equipped with the units, which are shown diagrammatically, for forming the artificial atmosphere for adjusting the oxygen concentration and pressure inside the chamber and also for absorbing and eliminating the carbon dioxide.

Referring now more particularly to the accompanying drawings, the chamber 1, which may be stationary or mobile, constitutes the storage compartment for containing the vegetables or fruit products to be treated. The chamber is provided with heat insulated walls. A pipe 2 extends into the chamber through one end thereof and is disposed under the ceiling in the longitudinal center plane of the chamber. The pipe 2 terminates adjacent the opposite end of the chamber where it is connected to a cross pipe 2' that extends over the whole width of the chamber and is closed at both ends. The cross pipe 2' is provided over its entire length with holes that are preferably inclined towards the interior of the chamber at an angle of about 45° relative to the plane of the ceiling. Pipes 3 and 3', which are disposed outside the chamber, are connected to the pipe 2. The pipe 3 extends from an apparatus 4 for the automatic measuring or dosing of the gas or gases for forming the artificial atmosphere in the chamber 1. The gas is supplied through a pipe 5, having a valve 6, from gas cylinders (not shown). The pipe 3', which is connected to an oxygen gas cylinder (not shown) is provided with a solenoid control valve 7 which is controlled by a pressure and vacuum gauge 10 having electric contacts, the control being effected through a circuit (not shown). The connection for the pipe 3' to the oxygen gas cylinder further includes the pipe 8 with the cock 9.

To eliminate the carbon dioxide from the bottom of the chamber 1, a set of basins 11 is provided, the basins containing calcium hydroxide in the solid state and being protected by a false bottom 12 formed by a wooden grid or grating. The basins are easily removable through a door 13 having a sealing closure. In addition to or as a substitution for the basins, a pipe 14 is provided and extends along the entire width of the chamber above the false bottom 12 in a position diagonally opposed to the pipe 2'. The pipe 14 is closed at its two ends and is provided for the intake of the carbon dioxide and other gases of the artificial atmosphere with large holes distributed over the entire length of the pipe and inclined upwardly at an angle approximately 45° relative to the plane of the floor of the chamber.

By means of the conduit 15 the pipe 14 is in communication with a cock 16 for discharging the gases to the exterior. A branch line 17 extends off from the conduit 15 and is provided with a cock 18, the branch 17 being in communication with an absorption tower 19 for absorbing the carbon dioxide.

The top of the tower 19 is connected with an aspirator 20 which can be placed in communication, through a cock 21, with a pipe 22 disposed beneath the ceiling of the chamber and positioned in the longitudinal center plane of the chamber over about two thirds of the length thereof. The pipe 22 is open to the atmosphere through a cock 23. The bottom of the tower 19 is connected by a pipe 25 to a tank 27 for collecting carbon dioxide. The pipe 25 is provided with a cock 24 which controls the flow from the tower 19. The pipe passes through a heater 26. The tank 27 is connected to a pump 29 by means of a piping 28 and the tank is also provided with a pipe 32 provided with a cock 33 for the recovery of carbon dioxide.

The unit for conditioning the artificial atmosphere comprises an evaporator 36 (Figure 2) which is provided with two helical fans 37 and 38 (Figure 3). A thermo expansion valve 39 is provided. A basin 40 is disposed under the evaporator 36 for collecting the condensate. The basin 40 is communicated with the exterior of the chamber through the pipe 41 which is provided with a cock 42. Electric heat convectors 43 and 44 are provided and have at their upper portions two helical fans 45 and 46. A thermostat 47 is provided, the thermostat being adjustable between temperatures of 0° C. and 50° C. for deviations comprising 1° C. and 10° C. (differential of thermostat). A sensitive element consisting of the bulb 48 is placed inside the chamber 1 and is connected to the thermostat. The evaporator is placed in a manner known per se in connection with a compressor and condenser frigorific group (not shown) which can serve at the same time, alone or with a stand-by compressor and condenser group, a certain number of chambers.

The equipment further comprises a tapping cock 34 on one wall of the chamber for tapping the gases for inspection analysis and a water column safety valve 35 (Figure 1).

The process, according to the present invention, is carried out by means of the equipment heretobefore described, in the following manner:

Having placed the vegetable products to be treated in the chamber 1 and having previously closed any communication with the exterior, the artificial atmosphere is formed as required for the intended treatment, the supplies delivered by the pipes 5 and 8 being utilized conveniently for this purpose.

When the operation of measuring the gases has been terminated and the desired artificial atmosphere has been obtained in the chamber, the pressure is adjusted as follows:

In the instance in which the intended purpose is the preservation of the product, a relative depression is established in the chamber by actuating the aspirator 20, after previously opening the valves 18 and 23 and while maintaining the valves 21 and 16 closed. On attaining the desired value of relative depression, the valves 23 and 18 are closed and the aspirator 20 is stopped. This depression may be on the order of 100–150 cm. of water column while the percent of oxygen in the artificial atmosphere is very low, that is to say, on the order of 3 to 10% or just sufficient to maintain latent life in the products treated.

In the case of artificial ripening, it is necessary to create inside the chamber an adequate relative pressure, which can be obtained during the final stage of the operation of introduction of oxygen, enriching at the same time the artificial atmosphere in the chamber with such gas. This relative pressure may be on the order of 100 to 200 cm. of water column, or the percentage of oxygen in the artificial atmosphere may vary from 40 to 80%. On attaining the necessary relative pressure or depression, the pressure in vacuum gauge 10 is set for the desired value and the electric circuit for closing or opening the solenoid valve 7 is closed, while the valve 9 is open and thus the chamber 1 is placed in communication with the oxygen gasholder.

The relative pressure or depression established initially is maintained automatically constant in the chamber by virtue of the discontinuous introduction of oxygen from time to time to replace the oxygen absorbed by the treated products and the carbon dioxide eliminated, which are the cause of the variations of the initial relative pressure or depression.

The depuration of carbon dioxide and of the other gaseous products of metabolism may take place with or without recovery. In the latter instance, the basins 11 are used and are contacted by the artificial atmosphere placed in circulation by the fans 37, 38, 45 and 46 during the operation of the conditioning equipment. The atmosphere is thus depurated by contact with the chemical absorbent (calcium hydroxide) contained in the basins. The latter are extracted and replaced through the door 13 when the absorbent is saturated. Such depuration method is particularly suited during transportation and for an installation having a small capacity.

In large installations, however, where there may be present economical and technical conditions making the recovery of carbon dioxide possible and convenient, such recovery may be utilized. In such instance, after previously opening the cocks 18 and 21 of the gas circuit and the cocks 24 and 31 of the closed circuit of the depurating solution, the aspirator 20, which is adjusted automatically passes the gaseous mixture to be depurated through the washing tower 19 in counter-current with the depurating solution and, through the valve 21, and again into the chamber 1 through the conduit 22, the flow being in a closed cycle fashion. The saturated depurating solution passes through the valve 24 and heater 26 and the carbon dioxide is carried off to the collector 27 from which the carbon dioxide passes through the conduit 32 to valve 33 to recovery. The pump 29 carries the regenerated solution through the pipe 30 back to the washing tower.

As can be seen in Figure 4, the conditioning apparatus is adapted to be operated in a continuous or automatic way, according to whether the switches 49 and 50 are closed or open. In other words, the operation depends on the action of the thermostat 47 upon the circuit.

The gaging of the thermostat 47 in relation with the temperature at which the treatment should be carried out and with the deviation of temperature (differential thermostat) determining its actuation, as well as the adjustment of the thermostatic valve 39 of the evaporator on which the evaporating temperature of the cooling liquid and, therefore, the more or less intensive dehumidification of the chamber depend, are operations that should be carried out prior to starting operation of the installation. The operations are carried out with reference to previously developed tabulations or charts.

In the continuous process, with the switches 49 and 50 closed and in the cooling stage, after having closed the switch 53 for connection with the line 54, the circuit of the motor 55, which drives the frigorific group (not shown), is fed through the safety members 51 and 52. The member 51 is a fuse while the member 52 is a magnetic switch for overload and under voltage protection.

With the switch 56 in the dotted line position of Figure 4, the switch 53 is closed to operate the fans 37 and 38 of the evaporator and, after previously closing the switches 57 and 58, the aspirator 20 and the pump for the depurating solution 29. If stronger ventilation is needed during the cooling stage, the switch 59 can be moved to the dotted line position of Figure 4 to operate the auxiliary fans 45 and 46.

For the heating stage, which is necessary in certain cases of artificial ripening in winter time or when for any reason the external temperature is exceedingly low, the switch 56 is moved to the position indicated by solid lines in Figure 4. The switch 60 is closed and through the safety members 61 (fuses) and 62 (magnetic switches) the heat conductors 43 and 44 are actuated. The operation thereof is detected by the pilot lamp 63, which lights up. The auxiliary fans 45 and 46 are simultaneously operated through the switch 59. The aspirator 20 and the pump 29 are operated by closing the switches 57 and 58.

For an automatic operation, the switches 49 and 50 must be open. The operation takes place, with regard to heating or cooling, in the same manner and is determined by the thermostat 47. The thermostat 47 is provided to operate through the remote contact breakers 52 and 62 on the two circuits for cooling and heating. The thermostat 47 may also alternatively operate in an automatic way on the two circuits for the cooling and heating by bringing the switches 56 and 59 into the position indicated in black lines in Figure 4 and by retaining permanently closed the switches 53, 57, 58 and 60. This is absolutely necessary when it is desired to have a minimum moisture degree in the closed chamber.

It is clear that the working details of the process and structural details of the equipment may vary depending upon the nature of the chambers, that is whether or not they are stationary or mobile. For example, the fans actuating the air conditioning, which in the illustrated embodiment are of helical form, may be in the form of centrifugal fans.

The source of energy which, in the case of stationary chambers is constituted by the standard three phase or single phase D.C. or A.C. electric supply main, will be constituted, in the case of mobile chambers, as, for example, railway cars, by a drive which extends from the wheel axle and by means of pairs of bevel gears and cardan joints is transmitted to the assembly defined by the aspirator, compressor and generator (dynamo) for the electric controls and the automatic controls.

Thus, while the preferred form has been shown and described herein, other forms may be realized as come within the scope of the appended claims.

What I claim is:

1. A process for retarding the ripening of vegetable products comprising the steps of storing the vegetable products in a closed, gas-tight room, maintaining an atmosphere in the room with an oxygen concentration different from that of the natural atmosphere and consisting of a concentration in a range of from 3% to 10%, with the remainder of the atmosphere consisting of inert gases, maintaining the pressure of the atmosphere in the room at a value between 100 cm. and 150 cm. of water column lower than normal atmospheric pressure, eliminating carbon dioxide in the room as it is formed, maintaining the relative humidity in the room at a value between 85% and 90%, and absorbing the heat developed from the products so as to maintain a substantially constant temperature in said room.

2. A process for accelerating the ripening of vegetable products comprising the steps of storing the vegetable products in a closed, gas-tight room, maintaining an atmosphere in the room with an oxygen concentration different from that of the natural atmosphere and consisting of a concentration of from 40% to 80% with the remainder of the atmosphere consisting of inert gases maintaining the pressure of the atmosphere in the room at a value different from normal atmospheric pressure and consisting of a pressure in a range from 100 cm. to 200 cm. of water column above normal atmospheric pressure, eliminating carbon dioxide in the room as it is formed, maintaining the relative humidity in the room at a value between 85% and 90%, and absorbing the heat developed from the products so as to maintain a substantially constant temperature in said room.

References Cited in the file of this patent

UNITED STATES PATENTS

| 541,368 | Leak et al. | June 18, 1895 |
| 1,678,046 | Holmes | July 24, 1928 |
| 1,817,875 | Broadbent | Aug. 4, 1931 |
| 1,920,540 | Winston | Aug. 1, 1933 |
| 2,251,617 | Pirnie | Aug. 5, 1941 |
| 2,351,853 | Graham | June 20, 1944 |
| 2,353,538 | Barber | July 11, 1944 |
| 2,739,522 | Graham | Mar. 27, 1956 |

FOREIGN PATENTS

| 397,848 | Great Britain | Aug. 29, 1933 |